United States Patent [19]

Kasuga

[11] 4,366,471

[45] Dec. 28, 1982

[54] VARIABLE SPEED DIGITAL REPRODUCTION SYSTEM USING A DIGITAL LOW-PASS FILTER

[75] Inventor: Masao Kasuga, Yokohama, Japan

[73] Assignee: Victor Company of Japan, Limited, Yokohama, Japan

[21] Appl. No.: 236,633

[22] Filed: Feb. 20, 1981

[30] Foreign Application Priority Data

Feb. 22, 1980 [JP] Japan ................................. 55-21178

[51] Int. Cl.$^3$ ........................................... H03K 13/02
[52] U.S. Cl. ...................... 340/347 DA; 179/15.55 T; 364/572
[58] Field of Search ...... 179/1 SM, 15.55 R, 15.55 T; 340/347 DA; 360/8, 9, 10, 11, 12, 13, 32, 36; 364/572, 581

[56] References Cited

U.S. PATENT DOCUMENTS

| | | | |
|---|---|---|---|
| 3,104,284 | 9/1963 | French | 179/1 SM |
| 3,803,358 | 4/1974 | Schirf | 179/1 SM |
| 3,982,070 | 9/1976 | Flanagan | 179/1 SM |
| 4,093,989 | 6/1978 | Flink | 364/572 |
| 4,216,504 | 8/1980 | Boussina | 360/10 |
| 4,302,776 | 11/1981 | Taylor | 360/9 |

*Primary Examiner*—Charles D. Miller
*Attorney, Agent, or Firm*—Lowe, King, Price & Becker

[57] ABSTRACT

A variable speed reproduction system includes a memory in which analog signal is stored as sampled digital data. A variable frequency digital low-pass filter is receptive of the data read out of the memory. A counter provides a binary representation of a count value of time base clock pulses to a comparator for detecting a coincidence with a variable speed setting of a variable resistor. The output of the comparator resets the counter and is used as a source of reading the data out of the memory. The cut-off frequency of the digital filter is controlled in response to the setting of the resistor so that the high frequency component of the analog equivalent of the input digital data which is higher than one-half of the data reading frequency is eliminated to prevent foldover distortion noise which might occur as a result of the difference between the recording and reproducing speeds. The data read out of the memory is fed to a digital-to-analog converter at a constant frequency and the quantum noise of the output data is filtered out by an analog low-pass filter.

8 Claims, 6 Drawing Figures

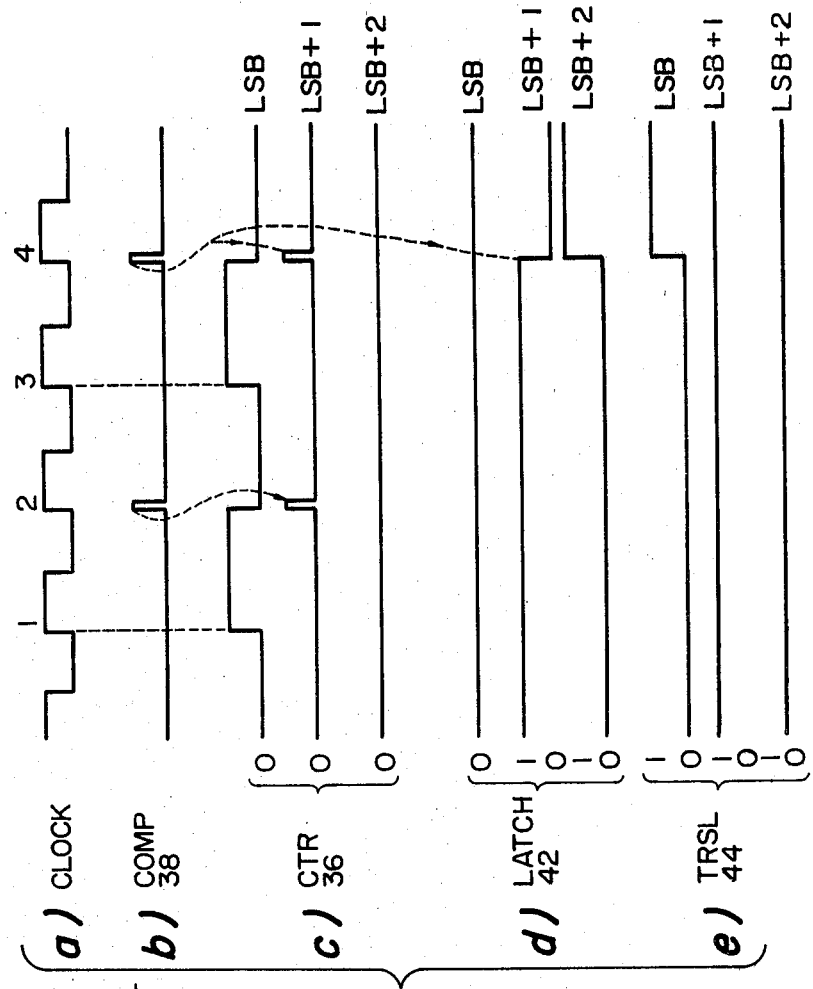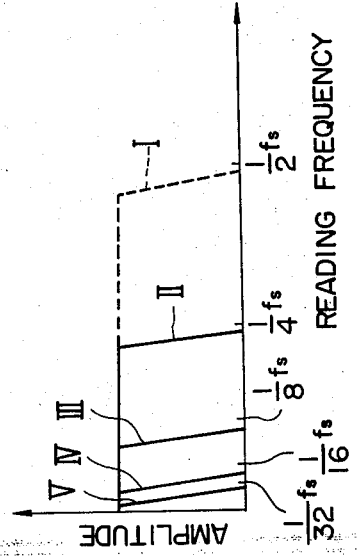

VARIABLE SPEED DIGITAL REPRODUCTION SYSTEM USING A DIGITAL LOW-PASS FILTER

BACKGROUND OF THE INVENTION

The present invention relates to a system for reproducing digital signals at a manually controllable frequency which may differ from the frequency at which the digital signals have been derived from original analog signal.

Editing a plurality of recorded signals into a combined signal for transcribing to a single output tape requires precision speed control for adjusting the speed of one tape with respect to another to permit the operator to locate an exact point of transition from one material to another so that they can be interconnected without appreciable discontinuities between them.

Conventionally, the original analog signal is sample and converted into a digital signal and stored as a pulse-code modulated data in a memory. The stored data is read out of the memory at a manually controllable frequency to permit the operator to locate the correct point of connection. Since the original sampling frequency is at least twice the bandwidth of the analog signal as is well known in the art, the bandwidth of the reproduced signal may exceed the upper frequency limit of a bandwidth to which the sampling frequency of the read out data should correspond if the speed of reproduction is lower than the speed at which the original signal is recorded into the memory. The frequency components above such upper limit cause a foldover distortion in the reproduced signal.

Another problem associated with the variable speed reproduction of sampled data resides in the fact that analog low-pass filters would be required in the amount corresponding to different reproduction speeds for smoothing out the reproduced digital signal.

SUMMARY OF THE INVENTION

Accordingly, an object of the present invention is to provide a system for reproducing an analog signal which is stored as sampled data in memory at a variable speed which may differ from the speed at which the analog signal has been sampled and recorded into the memory wherein the system is free from foldover distortion noise which might occur as a result of the difference between the recording and reproducing sampling frequencies.

In accordance with the invention, the above-mentioned system comprises a clock source for generating clock pulses which occur at a frequency corresponding to the speed at which the sampled data is recorded into the memory, a binary counter for counting the clock pulses to generate a first binary output representing the count value of the clock pulses, means for generating a second binary output representing the variable speed, and means for detecting a match between the first and second binary outputs to reset the binary counter to an initial count value and reading the stored data out of the memory in response to the occurrence of the detected match. The system further includes a digital low-pass filter for eliminating a high frequency component of the analog equivalent of the sampled data wherein the cut-off frequency of the filter is variable in response to the value of the second binary output so that the cut-off frequency corresponds substantially to one-half of the frequency at which the detected match occurs. A digital-to-analog converter is provided for converting a filtered signal from the digital low-pass filter at a constant frequency into a corresponding analog signal.

The second binary output is preferably derived from a circuit comprising a manually controlled variable resistor connected between terminals of a voltage source with its wiper tap point being connected to an analog-to-digital converter to develop a binary signal for comparison with the first binary output derived from the counter. A coincidence or match between the first and second binary outputs is detected by a digital comparator, whereby the output of the comparator occurs at intervals which represent an integral multiple of the cycle of the clock pulses, i.e. the ratio of the first to the second binary outputs. This integral multiple is varied corresponding with the manual control of the variable resistor so that the reproducing speed of the system may vary continuously in a range from the original recording speed down to approximately zero.

The digital low-pass filter is of the variable frequency type of a conventional design which includes a programmable read only memory (PROM) and a digital multiplier. The PROM is loaded with digital multiplying parameters which are addressed in response to the second binary, or variable speed control data so that the addressed parameters to the multiplier nullify the sampled data whose analog equivalent has a frequency bandwidth lying above one-half of the sampling frequency at which the sampled data is read out of the memory, whereby foldover distortion noise is eliminated from the output of the digital low-pass filter automatically in accordance with the manual adjustment of the variable resistor. Although the data is read out of the memory at a variable sampling frequency, the digital-to-analog converter is driven at a constant frequency for digital-to-analog conversion of the data read out of the memory. This constant frequency preferably corresponds to the original sampling frequency. To the output of the digital-to-analog converter is connected an analog low-pass filter for filtering out the quantum noise contained in the output of the digital-to-analog converter. Since the output data is sampled at a constant frequency, it is advantageous that only one low-pass filter is required even though the speed of reproduction is varied.

BRIEF DESCRIPTION OF THE DRAWINGS

The invention will be further described by way of example with reference to the accompanying drawings, in which:

FIG. 2 is a graphic illustration of the frequency response characteristics of the digital low-pass filter of FIG. 1 when the reading sample frequency is assumed to be $\frac{1}{2}$, $\frac{1}{4}$, $\frac{1}{8}$ and 1/16 of the recording sampling frequency fs for purposes of illustration;

FIGS. 3a to 3e are illustrations of waveforms appearing in the embodiment of FIG. 1.

DETAILED DESCRIPTION

Figure 1:
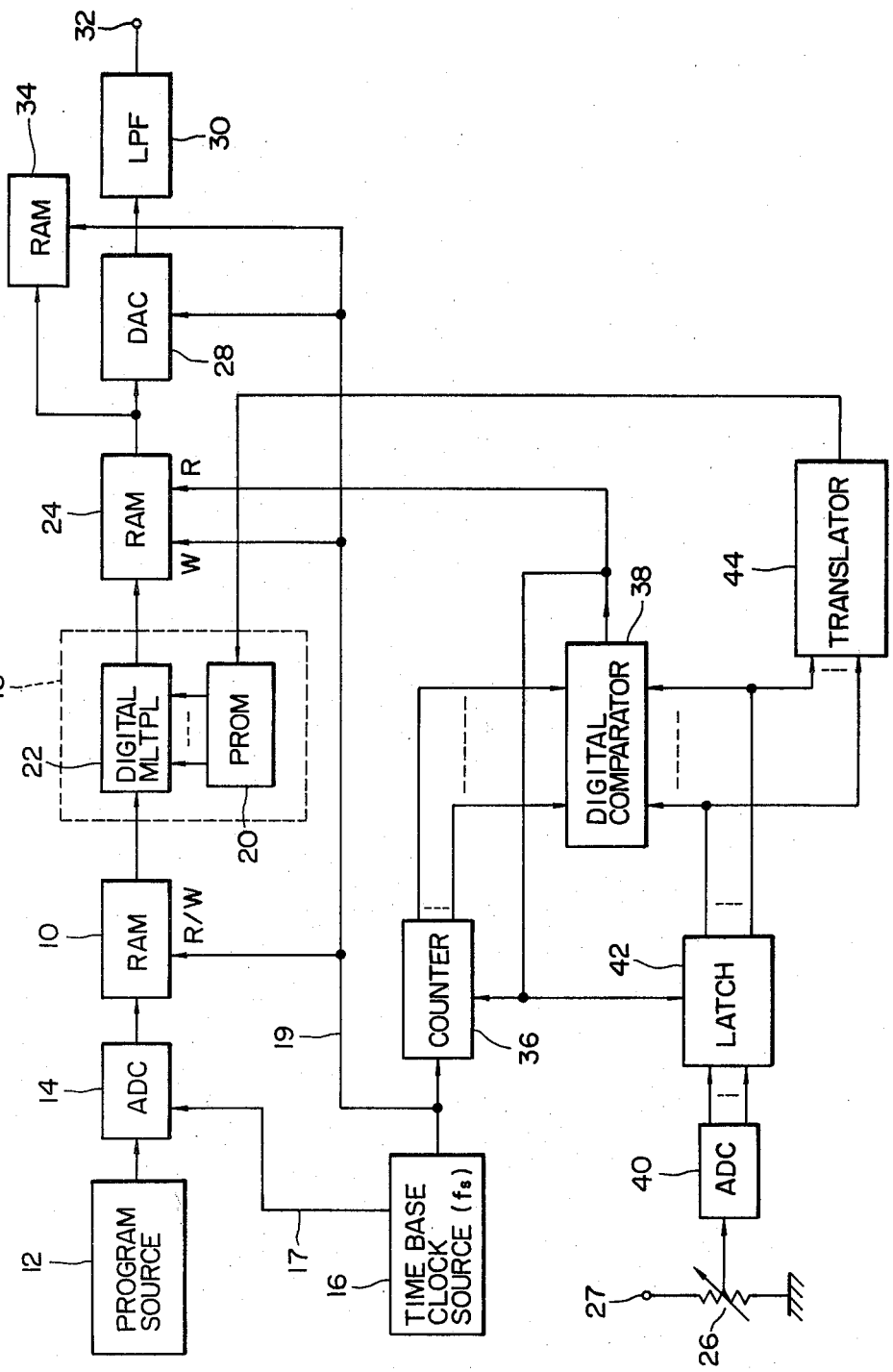
FIG. 1 is an illustration of a block diagram of an embodiment of the present invention.

Referring now to FIG. 1, a variable speed digital recording and reproducing system comprises a random access memory (RAM) 10 in which digitally modulated signals are stored in a row-column matrix of storage locations. The digital signals are derived from an analog program source 12 which may take the form of a conventional tape recorder or any other musical program source. An analog-to-digital converter 14, such as pulse-code modulation (PCM) encoder, is connected to the output of the program source 12 to sample the original analog signal in response to clock pulses at the clock frequency fs supplied through line 17 from a time base clock source 16. This clock source 16 also supplies clock pulses on line 19 at a frequency substantially corresponding to the original sampling frequency fs. As is well known in the art, the sampling frequency fs is at least twice the bandwidth of the analog signal. The sampled and digitally converted data are written into the RAM 10 in response to clock pulses on line 19.

A variable frequency digital low-pass filter 18 of a conventional design, such as finite interval response (FIR) or infinite interval response (IIR) type, is connected to the output of the RAM 10. As is well known in art, the FIR digital low-pass filter 18 comprises a programmable read only memroy (PROM) 20 and a digital multiplier 22 which provides multiplication of data supplied from the RAM 10 by those from the PROM 20 to eliminate the signal components which lie above the cut-off frequency determined by address data applied to the PROM 20.

To the output of the filter 18 is connected a second random access memory or latch 24 to store the filtered data at the sampling frequency fs and read out the stored data at a frequency variable in accordance with the setting of a manually controlled potentiometer or variable resistor 26 which is connected between a DC voltage source and ground. The data read out of the memory 24 are converted into an analog signal by a digital-to-analog converter 28 in response to clock pulses on line 19 and fed to an analog low-pass filter 30 and thence to an output terminal 32 which is connected to a utilization circuit, not shown. The output of the RAM 24 may also be fed to a RAM 34 to store the data read out of the RAM 24 at the variable rate for later retrieval.

A 5-bit binary counter 36 is provided to count the time base clock pulses supplied from the source 16 and generates in response to each count a binary representation of the count valve. The counter 36 supplies its binary count value through a plurality of lines connected from its 5 counter stages to first inputs of a digital comparator 38. The analog speed control voltage developed at the wiper terminal of the variable resistor 26 is applied to an analog-to-digital converter 40 in which the input analog voltage is converted into five bits of digital signal and fed to a latch 42. Th digital comparator 38 receives the latched data from latch 42 at its second inputs for making a comparison with the binary count data from counter 36 and provides a coincidence signal in response to there being a coincidence between them. This coincidence signal is applied to the counter 36 and to the latch 42 to clear the respective stored contents and this coincidence output is used to read out the data stored in the RAM 24.

Since the bandwidth of the analog equivalent of the data stored in the RAM 10 is one-half of the sampling frequency fs, the cut-off frequency of the digital filter 22 should substantially correspond to one-half of the frequency at which the output data is read out of the RAM 24 for the purposes of eliminating the higher frequency components which would otherwise cause foldover distortion. To this end, a translator 44 is connected to the output of the latch 42 to translate the latched binary data into appropriate address data so that the data read out of the PROM 20 in response thereto nullifies those digital signals of the analog equivalent which would produce foldover distortion.

As illustrated in FIG. 2, the bandwidth of the original analog signal ranges from zero to $(\frac{1}{2})$ fs as indicated by numeral I. If the reading frequency of the memory 24 is varied as at $(\frac{1}{2})$fs, $(\frac{1}{4})$fs, $(\frac{1}{8})$fs and (1/16)fs, for example, the cut-off frequency of the digital filter 18 will thus be varied as $(\frac{1}{4})$fs, $(\frac{1}{8})$fs, (1/16)fs and (1/32)fs, respectively, as indicated by numerals II, III, IV and V.

The operation of the embodiment of FIG. 1 will be better understood with reference to a timing diagram shown in FIGS. 3a to 3e. For purposes of simplicity only three bits from the least significant bit (LSB) position inclusive are illustrated. For a given setting value of the potentiometer 26 which is represented by "010", the outputs of the counter 36 coincide with the data latched in the latch 42 (FIG. 3d) at a second clock pulse "2" (FIG. 3a) so that the comparator 38 produces a coincidence output (FIG. 3b) which clears the counter 36 (FIG. 3c) and latch 42. If the manual adjustment is assumed to be unchanged, the contents of the latch 42 also remain unchanged. If the manual adjustment has changed to "100" during the time prior to the occurrence of a fourth clock pulse "4", the coincidence output which occurs at the fourth clock pulse will clear the latch 42 to "100" and the counter 36 to "000" again and renew the contents of the transrator 44 (FIG. 3e). Thereafter, the coincidence occurs at every four clock pulses to clear the counter 36 while the latch 42 and translator 44 will retain their stored values if the manual speed setting remains at "100".

If the speed setting value thereafter remains unchanged during the interval between the successive ones of the comparator output, the comparator 38 continues to generate one output pulse for every four clock pulses and as a result the RAM 24 is read at a frequency $(\frac{1}{4})$fs and the cut-off frequency of the digital filter 18 becomes $(\frac{1}{8})$fs. If the speed setting value has been changed during that interval, the contents of the latch 42 are updated to a renewed value "100", for example, which causes the translator 44 to renew its address data from "010" to "011" so that the data read out of the PROM 20 may correspond to the new ratio of the latched content to the contents of the counter 36. The interval between successive output pulses from the comparator 38 likewise changes in response to the new speed ratio so that the data is read out of the memory 24 at a frequency corresponding to the new speed setting.

Since the foldover components of the signal applied to the RAM 24 have been eliminated prior to application thereto, there is no foldover distortion noise in the data which are read out of the RAM 24 at a frequency lower than the sampling frequency fs. The data now read out of the memory 24 are converted into an analog signal at a frequency which preferably equals the sampling frequency fs from the stadpoint of quantum noise. Since the digital-to-analog converter 28 is sampled at the constant frequency for digital to analog conversion, only one low-pass filter 30 is required for smoothing out the quantum noise contained in the output of the converter 28.

In the above description, the reading speed of the stored data and the corresponding cut-off frequency of the digital filter 18 are varied in discrete steps. However, the amount of each variation could obviously be rendered small enough so that the reading speed is almost varied continuously throughout from zero to a maximum which corresponds to the sampling frequency fs.

Figure 4:
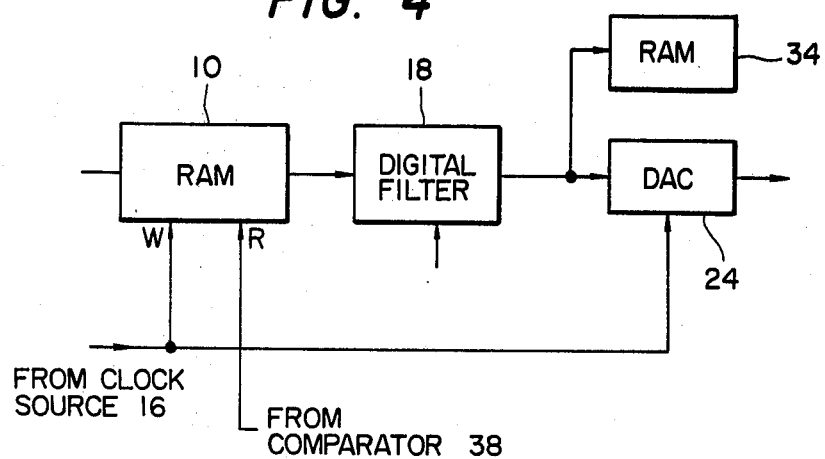
FIG. 4 is an illustration of a modified form of the embodiment of FIG. 1.

As illustrated in FIG. 4, the RAM 24 could be dispensed with by connecting the output of the comparator 38 to the RAM 10 to read out the data at the reduced frequency rather than at the sampling frequency fs. In this modification, the output of the variable frequency digital filter 18 is directly connected to the digital-to-analog converter 28 and to the output RAM 34.

Figure 5:
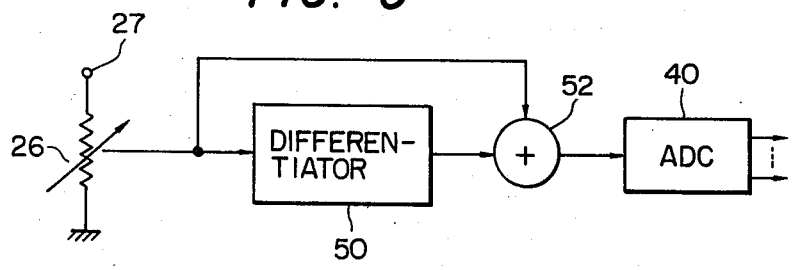
FIG. 5 is an illustration of another embodiment of the invention in which the reproduction speed is varied in response to the speed of movement of the manual control knob as well as to the setting point of the control knob.

FIG. 5 is an illustration of a further modification of the embodiment of FIG. 1 in which a differentiator circuit 50 is connected to the speed setting terminal of the variable resistor 26. The differentiator 50 thus provides an output which varies as a function of the speed of movement of the control knob of the variable resistor 26. The differentiator output is applied to one input of an adder 52 whose another input is connected to the voltage setting point of the variable resistor 26 to provide a combined analog voltage signal as the input to the analog-to-digital converter 40. With the variable resistor 26 being held in a given setting point, the analog-to-digital converter 40 generates a corresponding digital signal as described above to reproduce the original analog program signal at a described speed. By the provision of the differentiator circuit 50, the output of the adder 52 includes a signal representing the speed of movement of the wiper point of the variable resistor 26, so that the reading speed of the system can also be varied in correspondence with the manually moving speed of the control knob of the resistor 26.

Figure 6:
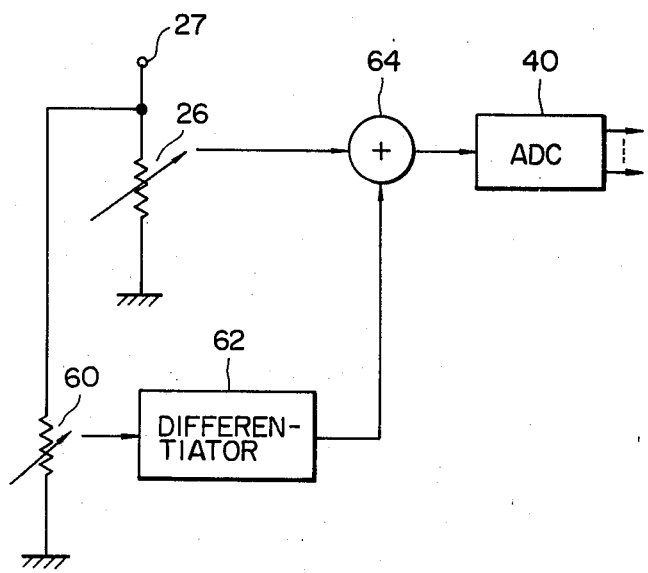
FIG. 6 is an illustration of a modified form of the embodiment of FIG. 5.

FIG. 6 is an illustration of a modified form of the embodiment of FIG. 5. In this modification, a second variable resistor 60 is provided having its wiper tap being connected to the input of a differentiator circuit 62. The output of the differentiator 62 is connected to an input of an adder 64 which receives its another signal from the wiper tap of the first variable resistor 26, the combined voltage being connected to the analog-to-digital converter 40. Thus, the operator is allowed to independently manipulate either one of the variable resistors 26, 60. The adjustment of variable resistor 26 establishes a predetermined reading speed of the system in a one-to-one correspondence between the each setting point of the variable resistor 26 and the reading speed as mentioned previously. On the other hand, the variable resistor 60 allows the operator to generate a signal representing the speed of movement of its wiper tap point regardless of the speed setting point of variable resistor 26.

What is claimed is:

1. A system for reproducing an analog signal which is stored as sampled data in memory means at a variable speed which may differ from the speed at which the analog signal is sampled and recorded into said memory means, comprising:

a clock source for generating clock pulses occurring at a frequency substantially corresponding to the speed at which said sampled data is recorded into said memory means;

a binary counter for counting said clock pulses to generate a first binary output representing the count value of said clock pulses;

means for generating a second binary output representing said variable speed;

means for detecting a match between said first and second binary outputs to reset said binary counter to an initial count value and reading the stored data out of said memory means in response to the occurrence of the detected match;

a digital low-pass filter for eliminating a high frequency component of the analog equivalent of the sampled data, the cut-off frequency of said filter being variable in response to the value of said second binary output so that the cut-off frequency corresponds substantially to one-half of the frequency at which said detected match occurs; and a digital-to-analog converter for converting a filtered signal from said digital low-pass filter at a constant frequency into a corresponding analog signal.

2. A system as claimed in claim 1, wherein said constant frequency at which said analog signal is converted corresponds to the frequency of said clock source.

3. A system as claimed in claim 1, further comprising an analog low-pass filter connected to the output of said digital-to-analog converter.

4. A system as claimed in claim 1, 2 or 3, wherein said digital low-pass filter is receptive of the sampled data read out of said memory means at the frequency at which said detected match occurs.

5. A system as claimed in claim 1, 2 or 3, wherein said memory means comprises a first memory into which said sampled data are written at the frequency of said clock source and a second memory, further comprising means for reading the stored data out of said first memory into said digital low-pass filter at the frequency of said clock source and writing the output of said digital low-pass filter into said second memory at the frequency of said clock source, and means for reading the stored data out of said second memory at the frequency at which said detected match occurs into said digital-to-analog converter.

6. A system as claimed in claim 1, 2 or 3, wherein said means for generating said second binary output comprises a manually adjustable variable resistor connected between terminals of a voltage source, an analog-to-digital converter for converting a voltage developed at a wiper tap point of said variable resistor into a corresponding digital signal, and a latch for storing said digital signal in response to said detected match.

7. A system as claimed in claim 6, further comprising a differentiator for differentiating the voltage developed at said wiper tap point of said variable resistor and means for combining the voltage developed at said wiper tap point with said differentiated voltage for application to said analog-to-digital converter.

8. A system as claimed in claim 6, further comprising a a second manually adjustable variable resistor connected between terminals of a voltage source, a differentiator for differentiating a voltage developed at a wiper tap point of said second variable resistor and means for combining the voltage developed at the wiper tap point of said second variable resistor with the voltage developed at the wiper tap point of the first-mentioned variable resistor for application to said analog-to-digital converter.

* * * * *